Figure 1:
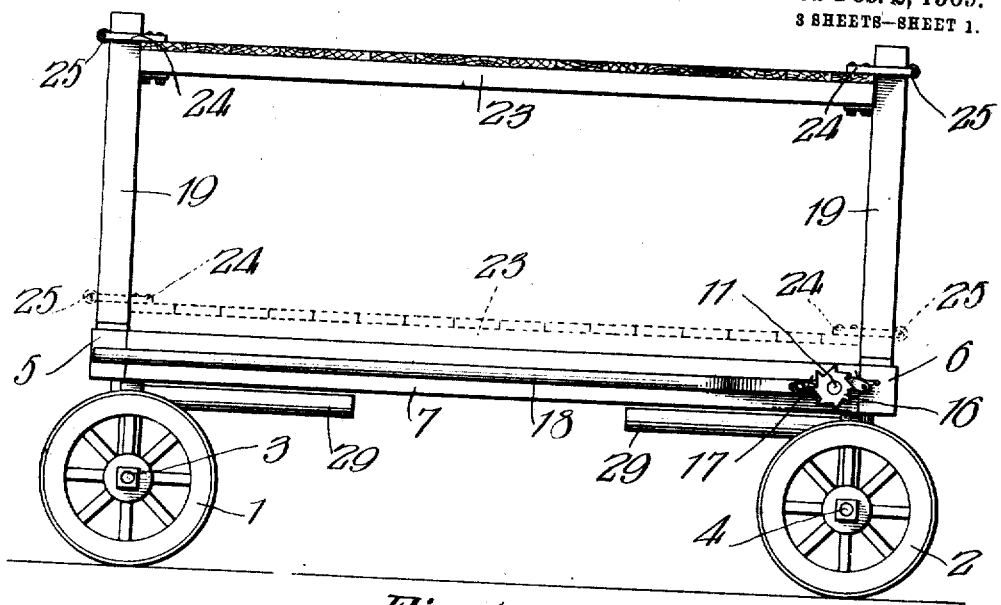

T. S. CHESNUTT.
LOADING TRUCK.
APPLICATION FILED JULY 13, 1908.

911,111.

Patented Feb. 2, 1909.
3 SHEETS—SHEET 1.

Witnesses
Chas. C. Richardson.
B. C. Cookey.

Inventor
Thomas S. Chesnutt,

By Chandler & Chandler
Attorneys

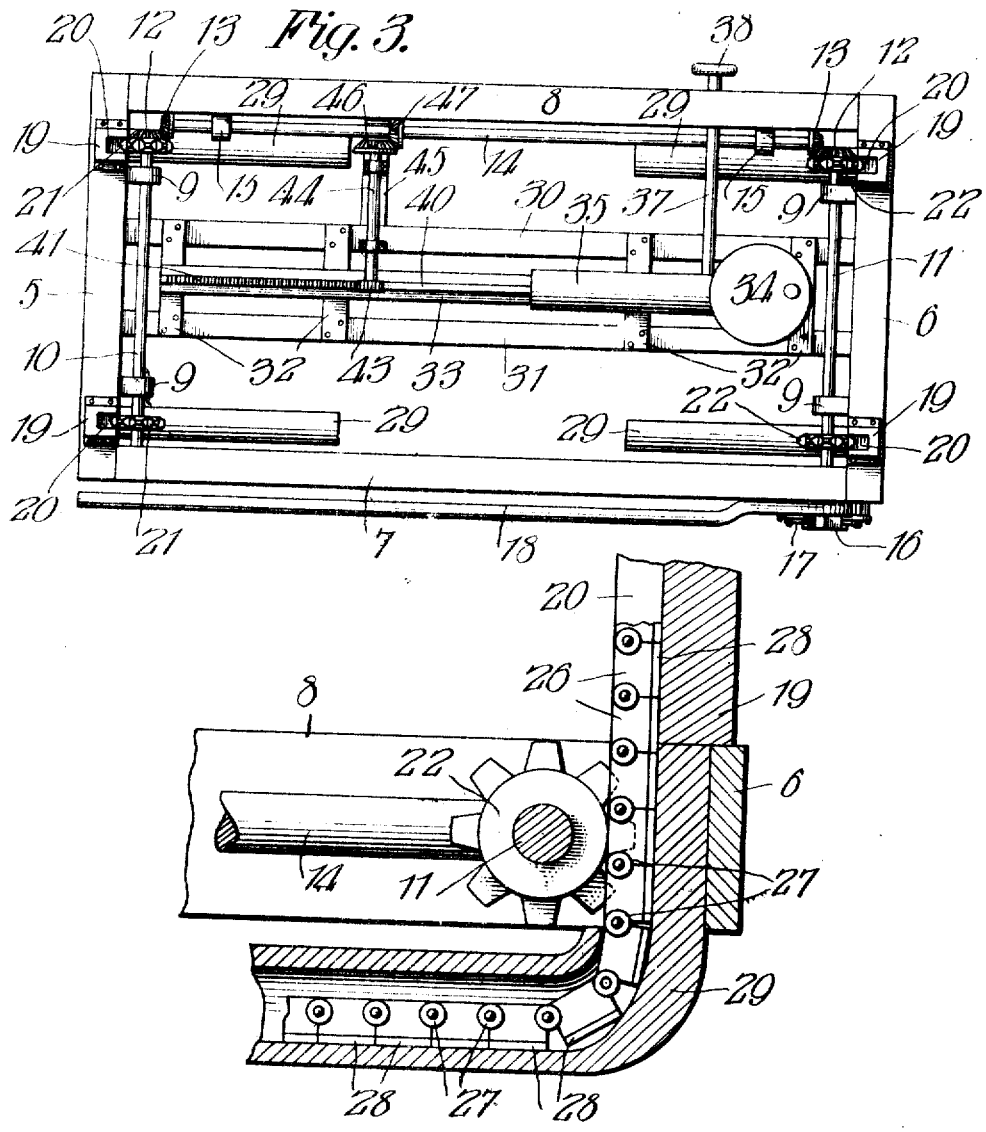

T. S. CHESNUTT.
LOADING TRUCK.
APPLICATION FILED JULY 13, 1908.

911,111.

Patented Feb. 2, 1909.
3 SHEETS—SHEET 3.

Witnesses
Chas C Richardson
B. E. Cookey

Inventor
Thomas S. Chesnutt,
By
Attorneys

UNITED STATES PATENT OFFICE.

THOMAS S. CHESNUTT, OF OKLAHOMA, OKLAHOMA, ASSIGNOR OF ONE-FOURTH TO L. LANGFORD, ONE-FOURTH TO PAUL B. SMITH, AND ONE-FOURTH TO WALTER B. THORNTON, ALL OF OKLAHOMA, OKLAHOMA.

LOADING-TRUCK.

No. 911,111.     Specification of Letters Patent.     Patented Feb. 2, 1909.

Application filed July 13, 1908. Serial No. 443,275.

*To all whom it may concern:*

Be it known that I, THOMAS S. CHESNUTT, a citizen of the United States, residing at Oklahoma City, in the county of Oklahoma, State of Oklahoma, have invented certain new and useful Improvements in Loading-Trucks; and I do hereby declare the following to be a full, clear, and exact description of the invention, such as will enable others skilled in the art to which it appertains to make and use the same.

The present invention has reference to improvements in loading trucks designed particularly for use at ware houses, depots, and freight stations, to facilitate the loading and unloading of live stock and heavy articles of baggage onto and from trains, the primary object of the invention residing in the provision of a truck including a vertically-movable platform raised and lowered by an extremely simple and effective mechanism.

More especially, the invention resides in the particular construction of this mechanism which includes a pair of parallel sprocket chains arranged adjacent the side edges of the platform and having their ends extending into vertical channels or runways formed in the inner faces of the standards set at the corners of the truck frame, said chains being engaged by sprockets carried by the end members of a series of inter-geared shafts which are journaled in bearings secured to said frame, one of said shafts being provided with operating devices connected thereto.

The invention further resides in the particular devices employed for holding the drive shaft against backward rotation, and thus preventing displacement of the platform, when the latter has been raised above the truck frame, and it resides still further in the provision of devices for regulating the speed at which the platform descends, and in the particular construction of such devices.

The preferred embodiment of the invention is illustrated in the accompanying drawings, in which corresponding parts, or features, as the case may be, are designated by the same reference numerals in the several views.

Figure 2:
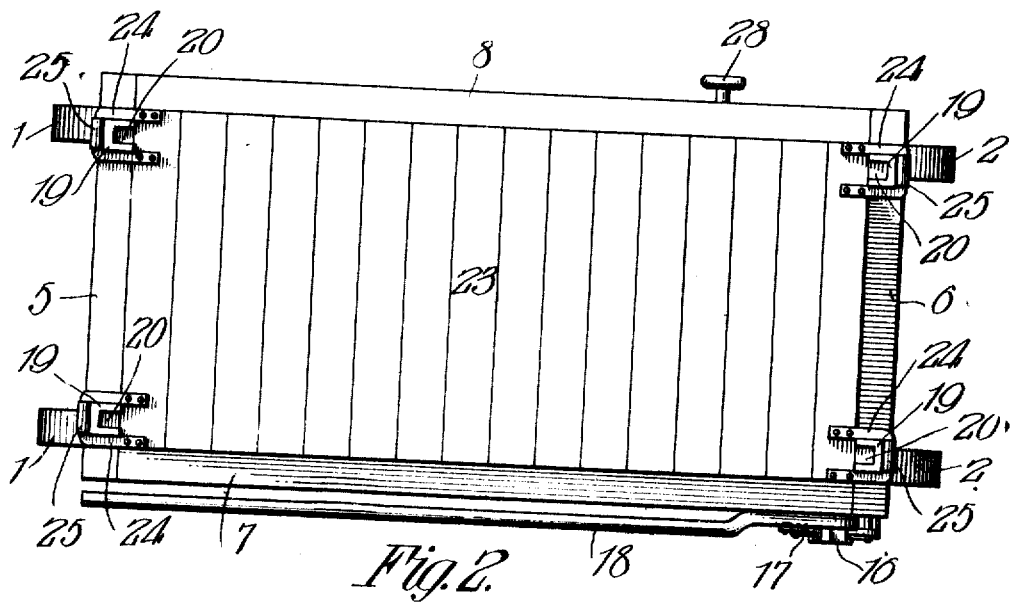
Figure 5:
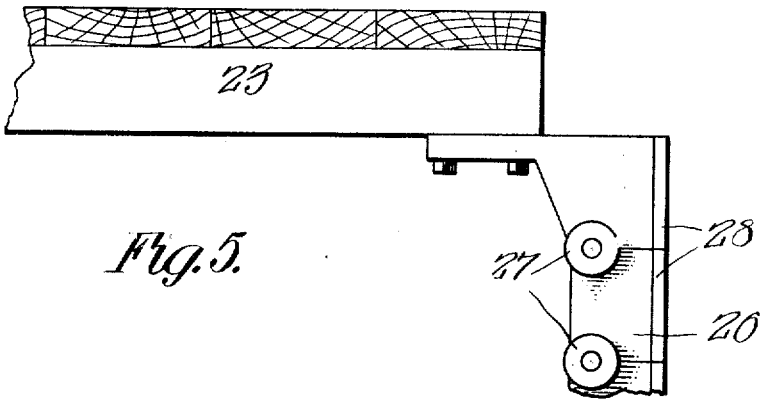
Figure 6:
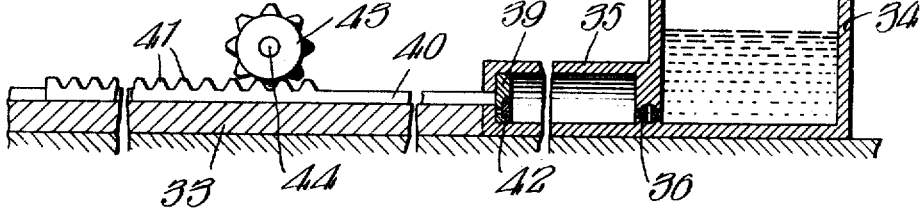
Figure 7:
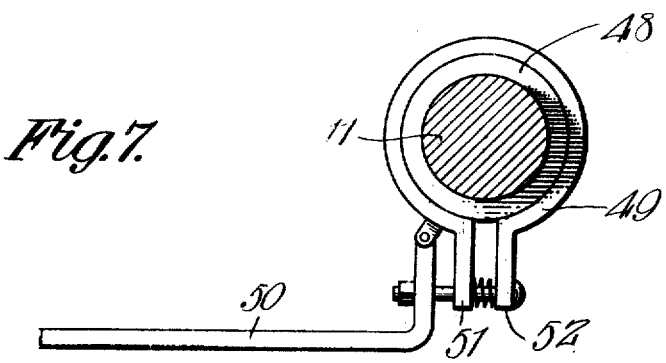

Of the said drawings, Figure 1 is a side elevation of the complete truck, showing the platform in raised position in full lines and in lowered position in dotted lines. Fig. 2 is a plan view thereof. Fig. 3 is a plan view of the truck frame and the operating devices mounted thereon. Fig. 4 is an enlarged vertical section through one of the standards and the chain guide with which it is connected, the chain being likewise shown. Fig. 5 is an enlarged fragmental view of the end of one of the chains. Fig. 6 is an enlarged longitudinal section through the tank and cylinder of the brake mechanism. Fig. 7 is an enlarged detail view of a modified form of brake mechanism.

Referring more particularly to the drawings, the open rectangular truck frame which is supported upon the front and rear wheels 1 and 2 carried by the axles 3 and 4, is shown as comprising front and rear end members 5 and 6, and left and right hand sides 7 and 8. The first mentioned members have secured to their inner side faces a pair of laterally-projecting arms 9 provided with alining openings in which are journaled the front and rear transverse shafts 10 and 11, the right hand end of each shaft carrying a pinion 12 which meshes with a pinion 13 secured to the adjacent end of a longitudinal shaft 14 journaled in bearing openings formed in a pair of lateral brackets 15 secured to the inner side face of the frame member 8. The left hand end of the shaft 11 projects through an opening formed in the side 7 and is provided at such point with a ratchet wheel 16 rigidly secured thereto and arranged in spaced relation to the outer side face of said member, said wheel being arranged for engagement with a pawl 17 carried by an operating lever 18 whose rear end is provided with an opening through which said shaft loosely extends. The front and rear members 5 and 6 are each provided adjacent their opposite ends with a pair of standards 19 each standard terminating in a base plate by means of which it is bolted to the corresponding frame member. The inner face of each standard is channeled longitudinally from end to end as indicated by the numeral 20, the disposition of the standards upon said frame members being such that the channels above referred to are directly opposite a pair of sprockets 21 and 22 with which the shafts 10 and 11 are each provided.

The platform 23 which is mounted above the truck frame and is movable towards and from the same by the devices hereinafter described, is provided at its front and rear edges with a pair of laterally-projecting U-shaped brackets or stirrups 24 which straddle the adjacent standards, the bight portion of each stirrup carrying an antifriction roller 25 which contacts with the adjacent face of the standard. To the under face of the platform adjacent its front and rear edges are bolted the upper ends of a pair of chains 26, the grooved links of which are pivoted together by means of stud rivets 27, the reinforced backs 28 of the links fitting in the channels 20 in the corresponding standards, the chains being operated by the pairs of sprockets 21 and 22 which engage the links of the chains as will be apparent. The lower end of the channel in each standard registers with an opening formed vertically through the corresponding frame member, in which opening is fitted the upwardly bent outer end of a tubular guide 29, as shown in Fig. 4, into which guides the lower ends of the chains extend when the platform is in its lowered position. The end faces of the links of each chain are plain, so as to fit flush against each other during the movements of the chains, the chains flexing only during their passage around the sprockets, which, however takes place slightly before the platform reaches the limit of its downward movement, or in other words, when the lower ends of the chains pass into the guides 29, the length of the chains being such that when the platform is raised, the sprockets engage only the lowermost links of the chains.

From the foregoing, it will be understood that the rotation of the shaft 11 which is effected by means of the oscillating lever 18 whose pawl engages the ratchet 16, is transmitted to the shaft 14 and thence to the front shaft 10 through the pairs of intermeshing pinions 12 and 13, the several shafts rotating in unison. The rotation of the shafts 10 and 11, and the engagement of the sprockets 21 and 22 carried thereby with the chains 26, will cause the platform to move bodily upwardly above the truck frame, the necessary rigidity being imparted to the chains by reason of the particular construction of the links thereof, i. e., the formation of the same with plain faces.

The front and rear frame members 5 and 6 are further connected by a pair of longitudinal reaches 30 and 31 arranged in spaced relation to each other, said reaches being connected together by means of a series of cross pieces 32 which support a longitudinally-channeled beam 33. At their front ends the reaches 31 and 32 support an oil tank 34 with the lower portion of which communicates a cylinder 35, the communication being opened and closed by a cut-off valve 36 provided with a stem 37 which extends through an opening formed in the frame side 8 and has a hand wheel 38 secured to its outer end. Within the cylinder 35 is movable the head 39 of a piston whose stem 40 is provided with a longitudinal series of rack teeth 41, said stem fitting in the channel in the beam 33. The piston head 39 is provided with an inwardly-extending flat valve 42. The rack teeth 41 with which the piston stem is provided are engaged by a pinion 43 secured to the inner end of a transversely-disposed shaft 44 journaled in brackets carried by the reach 30 and by a brace 45 which connects said reach with the frame member 8. The outer end of the shaft 44 is provided with a pinion 46 which meshes with a pinion 47 secured to the shaft 14. By reason of this construction, the rotation of the shaft 14 will effect that of the shaft 44 and of the pinion 43 carried by the latter, the movement of the pinion effecting an endwise outward movement of the piston by reason of the engagement of the gear 43 with the rack teeth 41. The movement of the piston will effect the filling of the cylinder 35 with oil as will be understood. When the platform has been raised to the desired height, the cut-off valve 36 is turned in the proper direction by means of its hand wheel, to close the communication between the cylinder and the tank. The pressure of the oil in the cylinder against the head of the piston, which latter as stated, is then at the limit of its outward movement, will retain the platform in its elevated position.

When the platform is to be lowered, the communication between the cylinder and the tank is opened by means of the cut-off valve, whereupon the platform will slowly descend, the speed of such descent being regulated by the cut-off valve whose position regulates the flow of the oil to the tank. When the platform reaches a certain point in its downward movement, the lower ends of the chains pass around the sprockets and enter the guides, as above stated.

While the descent of the platform is preferably controlled by the hydraulic brake mechanism above described, it is to be understood that the invention is not entirely dependent upon such mechanism, since it may be replaced by the friction brake mechanism shown in Fig. 7, such mechanism comprising a friction wheel 48 secured to the shaft 11 and interposed between the ratchet wheel 16 and the adjacent face of the frame member 7, a friction band 49 embracing said wheel, and a lever 50 pivoted to an ear formed adjacent the block 51 with which one of the ends of the band 49 is provided, said lever effecting the movement of said block towards the block 52 located at the other end of the band.

It will thus be seen that the invention includes mechanism for raising the platform to the desired height, mechanism for retaining the platform in its elevated position, and mechanism for effecting a gradual descent of the platform after the loading or unloading has been completed.

What is claimed is:

1. The combination, with the frame of a truck, and a standard located at each corner of the frame and having its inner face longitudinally channeled, of a vertically-movable platform mounted upon the frame and provided at each corner with a laterally-projecting member engaging the adjacent standard; a depending member secured to each corner of the platform and fitted in the channel of the adjacent standard; and means engaged with said depending members, for raising the platform into elevated position.

2. The combination, with the frame of a truck and a standard located at each corner of the frame and having its inner face longitudinally channeled, of a vertically-movable platform mounted upon the frame and provided at each corner with a laterally-projecting member engaging the adjacent standard; a depending member secured to each corner of the platform and fitted in the channel of the adjacent standard; means engaged with said depending members, for raising the platform into elevated position; and separate mechanism for controlling the speed at which the platform descends.

3. The combination, with the frame of a truck and a standard located at each corner of the frame and having its inner face longitudinally channeled, of a vertically-movable platform mounted upon the frame and provided at each corner with a laterally-projecting member engaging the adjacent standard; a depending member secured to each corner of the platform and fitted in the channel of the adjacent standard; and front and rear transverse shafts carried by the frame; means for rotating said shafts in unison; and means carried by each shaft and arranged for engagement with said depending members, to raise the platform into elevated position when said shafts are rotated in one direction.

4. The combination, with the frame of a truck and a standard located at each corner of the frame and having its inner face longitudinally channeled, of a vertically-movable platform mounted upon the frame and provided at each corner with a laterally-projecting member engaging the adjacent standard; a depending member secured to each corner of the platform and fitted in the channel of the adjacent standard; front and rear transverse shafts carried by the frame; means for rotating said shafts in unison; means carried by each shaft and arranged for engagement with said depending members, to raise the platform into elevated position when said shafts are rotated in one direction; and separate mechanism for controlling the speed at which the platform descends.

5. The combination, with the frame of a truck, of a standard located at each corner of the frame and having its inner face longitudinally channeled, each corner of the frame being provided with an opening registering with the channel in the adjacent standard; a series of tubular guides having their outer ends fitted in said openings; a vertically-movable platform mounted upon the frame and provided at each corner with a depending member fitted in the channel in the adjacent standard; and means engaged with said members, for raising the platform into elevated position, the lower ends of said members entering said guides when the platform descends.

6. The combination, with the frame of a truck, of a standard located at each corner of the frame and having its inner face longitudinally channeled, each corner of the frame being provided with an opening registering with the channel in the adjacent standard; a series of tubular guides having their outer ends fitted in said openings; a vertically-movable platform mounted upon the frame and provided at each corner with a depending member fitted in the channel in the adjacent standard; means engaged with said members, for raising the platform into elevated position, the lower ends of said members entering said guides when the platform descends; and separate mechanism for controlling the speed at which the platform descends.

7. The combination, with the frame of a truck, of a standard located at each corner of the frame and having its inner face longitudinally channeled, each corner of the frame being provided with an opening registering with the channel in the adjacent standard; a series of tubular horizontal guides each provided with an upturned outer end fitted in the adjacent opening; a vertically-movable platform mounted upon the frame and provided at each corner with a depending flexible member fitted in the channel in the adjacent standard; and means engaged with said members, for raising the platform into elevated position, the lower ends of said members entering said guides when the platform descends.

8. The combination, with the frame of a truck, of a standard located at each corner of the frame and having its inner face longitudinally channeled, each corner of the frame being provided with an opening registering with the channel in the adjacent standard; a series of tubular guides having their outer ends fitted in said openings; a vertically-movable platform mounted upon the frame; a laterally-projecting member secured to each corner of the platform and adapted for engagement with the adjacent standard; a series of sprocket chains each secured at its upper end to one of the corners of the platform and fitted in the channel in the adjacent standard; front and rear transverse shafts carried by the frame; means for rotating said shafts in unison; and a pair of sprockets carried by each shaft and arranged for engagement with the adjacent chains, to raise the platform into elevated position when said shafts are rotated in one direction, the lower ends of said chains entering said guides as the platform descends.

9. The combination, with the frame of a truck, of a standard located at each corner of the frame and having its inner face longitudinally channeled, each corner of the frame being provided with an opening registering with the channel in the adjacent standard; a series of tubular horizontal guides each provided with an upturned outer end fitted in the adjacent opening; a vertically-movable platform mounted upon the frame; a laterally-projecting member secured to each corner of the platform and adapted for engagement with the adjacent standard; a series of sprocket chains each secured at its upper end to one of the corners of the platform and fitted in the channel in the adjacent standard; front and rear transverse shafts carried by the frame; means for rotating said shafts in unison; a pair of sprockets carried by each shaft and arranged for engagement with the adjacent chains, to raise the platform into elevated position when said shafts are rotated in one direction, the lower ends of said chains entering said guides as the platform descends; and separate mechanism for controlling the speed at which the platform descends.

10. The combination, with the frame of a truck, of a platform mounted above the truck and movable towards and from the same; mechanism for raising the platform into elevated position; and separate hydraulic brake mechanism for controlling the speed at which the platform descends.

11. The combination, with the frame of a truck and a standard located at each corner of the frame and having its inner face longitudinally channeled, of a vertically-movable platform mounted upon the frame and provided at each corner with a laterally-projecting member engaging the adjacent standard; a depending member secured to each corner of the platform and fitted in the channel of the adjacent standard; means engaged with said depending members, for raising the platform into elevated position; and hydraulic brake mechanism for controlling the speed at which the platform descends.

12. The combination, with the frame of a truck, and a standard located at each corner of the frame and having its inner face longitudinally channeled, of a vertically-movable platform mounted upon the frame and provided at each corner with a laterally-projecting member engaging the adjacent standard, a depending member secured to each corner of the platform and fitted in the channel in the adjacent standard; front and rear transverse shafts carried by the frame; means for rotating said shafts in unison; means carried by each shaft and arranged for engagement with the adjacent depending members, to raise the platform into elevated position when said shafts are rotated in one direction; and a hydraulic brake mechanism for controlling the rotation of the shafts in the other direction, to regulate the speed at which the platform descends.

In testimony whereof, I affix my signature, in presence of two witnesses.

THOMAS S. CHESNUTT.

Witnesses:
W. A. STEVENS,
W. C. GOWING.